United States Patent

Stürmer

[15] 3,691,861

[45] Sept. 19, 1972

[54] TRANSMISSION ARRANGEMENT WITH BASIC TRANSMISSION MECHANISM

[72] Inventor: Hans Stürmer, Stuttgart, Germany

[73] Assignee: Robert Bosch, GmbH, Stuttgart, Germany

[22] Filed: March 4, 1968

[21] Appl. No.: 710,060

[30] Foreign Application Priority Data

March 3, 1967 Germany...................B 91449

[52] U.S. Cl. .......................74/330, 74/333, 74/359, 74/337.5

[51] Int. Cl. ............................................F16h 3/08

[58] Field of Search..............74/330, 333, 359, 337.5

[56] References Cited

UNITED STATES PATENTS

| | | | |
|---|---|---|---|
| 1,619,701 | 3/1927 | Chorlton | 74/765 |
| 2,386,217 | 10/1945 | Kegresse | 74/330 |
| 2,505,450 | 4/1950 | Wemp | 74/330 |
| 2,809,534 | 10/1957 | Winther | 74/330 |
| 1,935,211 | 11/1933 | Krohn | 74/359 X |
| 2,469,881 | 5/1949 | Laubach et al. | 74/359 X |
| 2,615,349 | 10/1952 | Winther | 74/330 X |
| 2,991,661 | 7/1961 | Rambauser | 74/330 |

FOREIGN PATENTS OR APPLICATIONS

| | | | |
|---|---|---|---|
| 1,060,821 | 11/1953 | France | 74/337.5 |
| 596,575 | 8/1959 | Italy | 74/330 |

*Primary Examiner*—William L. Freeh
*Attorney*—Michael S. Striker

[57] ABSTRACT

A basic multistage constant mesh transmission mechanism can be used in an automatic transmission by providing a first input unit with two input shafts and a main clutch for connecting the same selectively to a drive shaft, and in a manual transmission by using a second input unit with a single input shaft and a standard clutch so that the cost of the basic transmission mechanism can be reduced by mass production.

7 Claims, 4 Drawing Figures

INVENTOR
Hans STÖRMER

TRANSMISSION ARRANGEMENT WITH BASIC TRANSMISSION MECHANISM

BACKGROUND OF THE INVENTION

The present invention relates to transmissions of the type used in motorcars and having a plurality of gear stages for connecting the engine with the wheels of the car.

More particularly, the present invention relates to a constant mesh transmission in which pairs of gears are in constant meshing engagement, and are selectively rendered operative by coupling selected gears with a shaft of the transmission, to which other gears are secured.

Manually operated constant mesh transmissions of this type are known, and have the disadvantage that the transmission of torque between the drive shaft and the output shaft of the transmission is interrupted during the shifting of the transmission.

Automatic constant mesh transmissions are also known which permit a shifting of the transmission without interruption of the torque transmitted from the drive shaft to the output shaft of the transmission. Automatic transmissions of this type have two input clutches, each of which cooperates with a separate input shaft. When the transmission is to be shifted, the two clutches are alternatively rendered operative in two engaged positions, while in an intermediate position the torque is also transmitted from the drive shaft to the output shaft.

It is a disadvantage of transmissions according to the prior art that the automatic transmissions have a basically different construction than the manually operated transmissions so that a complete set of transmission parts has to be manufactured and maintained in storage for automatic transmissions, as well as for manual transmissions. No part of an automatic transmission can be replaced by a part of a manual transmission, which causes high storage and replacement costs, particularly if the parts are manufactured in comparatively small series.

SUMMARY OF THE INVENTION

It is one object of the invention to provide a transmission arrangement which reduces the cost of manufacture, storage, replacement, and servicing as compared with prior art transmissions by providing a basic transmission mechanism which can be selectively used with different input units.

Another object of the invention is to use a basic transmission mechanism in an automatic transmission arrangement and in a manual transmission arrangement.

Another object of the invention is to provide an automatic transmission and a manual transmission which have a basic transmission mechanism in common, so that the parts of the basic transmission mechanism can be manufactured in a series whose number corresponds to the total number of automatic and manual transmissions.

Another object of the invention is to provide an automatic transmission with an input unit which can be exchanged for a different input unit of a manual transmission.

Another object of the invention is to provide a automatic transmission and a manual transmission having a basic transmission mechanism in common so that the same machines can be used for manufacturing parts of the automatic transmission and parts of the manual transmission.

With these objects in view, the present invention comprises a basic transmission mechanism, preferably of the constant mesh type with shift clutches for shifting the basic transmission mechanism between different stages. The basic transmission mechanism includes first and second transmission members, such as gears, and shift clutches. In accordance with the invention, the first and second transmission members are either secured to first and second input shafts of a first input unit, or to a single input shaft of a second input unit, depending on the use of the transmission as an automatic or manual transmission. In the first case, the main clutch has two engaged positions for connecting the drive shaft of the engine with the first and second input shafts, respectively, and in the second case, a main clutch having only one engaged condition connects the drive shaft with the single input shaft.

One embodiment of the invention comprises a basic transmission mechanism including first and second transmission members and an output shaft, input shaft means including a first input shaft and a second input shaft connected with the first and second transmission members, respectively, for rotation, and a main clutch having first and second engaged positions for selectively connecting a drive shaft with the first and second input shafts, respectively, while transmitting an uninterrupted drive torque to the input shaft means and the output shaft.

In accordance with the invention, the basic transmission mechanism is arranged and constructed so that, for changing from automatic operation to manual operation, the first and second input shaft can be replaced by an integral input shaft means which is also connected with both the first and second transmission members. A main clutch having only one engaged position can then be used. Consequently, the same basic transmission mechanism forms a part of either an automatic transmission or of a manual transmission so that either type of transmission can be economically manufactured and maintained.

The basic transmission mechanism preferably includes input shaft means coaxial with the output shaft, pairs of meshing gears, which are secured to the shafts, and some of which are freely rotatable of the same, and are connected with the respective shaft by operation of shift clutches.

In the preferred embodiment of the invention, the transmission has four stages with different transmission ratios, irrespective of whether the input means are constructed of two input shafts in an automatic transmission, or only with one input shaft for use in a manual transmission.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a diagrammatic illustration of the sequence of clutch operations required for shifting the transmission between four forward speeds and one reverse speed;

DESCRIPTION OF THE PREFERRED EMBODIMENT

Figure 1:
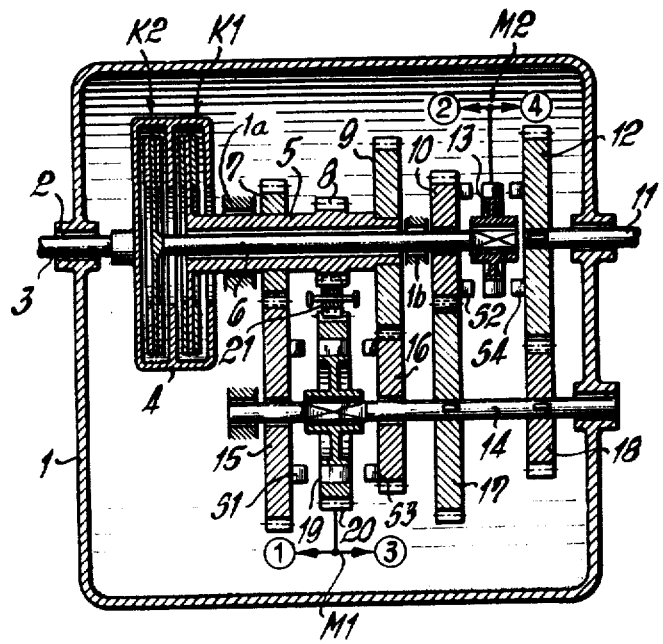
FIG. 1 is a fragmentary schematic sectional view illustrating an automatic transmission according to the invention.

Referring now to FIG. 1, an automatic transmission arrangement according to the illustrated embodiment has a casing 1 with two aligned bearings 2 respectively supporting a drive shaft 3 and an output shaft 11 which are aligned. Another bearing means 1a mounts shaft 5 in the assembly of FIG. 1 and shaft 22 in the assembly of FIG. 3. Drive shaft 3 is driven by a motor, for example a combustion engine, not shown, and output shaft 11 drives a shaft connected with the differential of the rear wheels of a motorcar, not shown.

Figure 3:
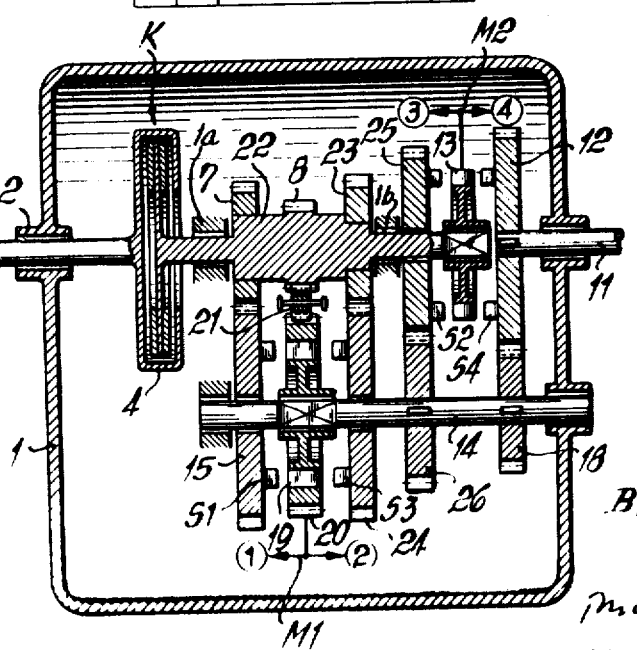
FIG. 3 is a fragmentary schematic sectional view illustrating a manual transmission using the same basic transmission mechanism as the automatic transmission shown in FIG. 1.
Figure 4:
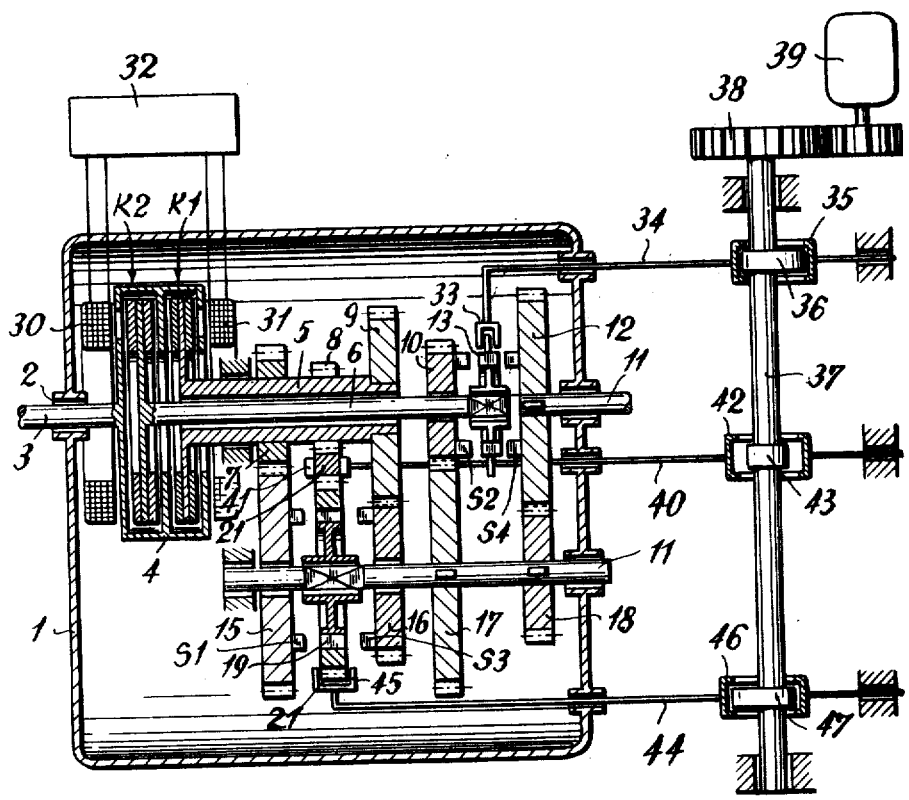
FIG. 4 is a fragmentary schematic sectional view illustrating the automatic transmission of FIG. 1 together with control means by which the transmission is shifted between four forward speeds and one reverse speed by actuation of the main clutch, and of shift clutches.

Drive shaft 3 drives the drive part 4 of a main clutch which includes two driven movable clutch parts K1 and K2 which are respectively carried by a hollow first input shaft 5, and by a second input shaft 6 which passes through the hollow input shaft 5 and which has a portion supported in a bearing 1b in casing 1. In the assembly of FIG. 3, a portion of shaft 22 having the same diameter as shaft 6, is mounted in bearing 1b. As shown in FIG. 4, windings 30 and 31 are secured to opposite sides of the clutch drive part 4 so that each driven clutch part K1 and K2 has two engaged positions for connecting either the first hollow input shaft 5, or the second inner input shaft 6 with drive part 4 and drive shaft 3. In the intermediate position, both driven coupling parts K1 and K2 momentarily connect both input shafts 5,6 with drive shaft 3 so that a torque is continuously transmitted from drive shaft 3 to the transmission. Means 4, K, K₂, 5, 6 form a first input unit.

In the manually operated transmission shown in FIG. 3, input shafts 5 and 6 are combined in an integral stepped input shaft means 22 which has in an axial plane partly the same outline or shape as the hollow input shaft 5 and the projecting shaft portion of the inner input shaft 6. Input shaft means 22 is connected to a driven clutch part K which cooperates with the drive part of the clutch in one engaged position for transmitting torque from the drive shaft 3 to the input shaft means 22. Means K,22 form a second input unit which can replace the first input unit to cooperate with the basic transmission mechanism, which will now be described.

Three gears 7, 8 and 9 are fixed to input shaft 5, and corresponding three gears 7, 8 and 23 are fixed to the single input shaft 22 of the embodiment of FIG. 3 in a region having the same diameters as the hollow shaft 5. A gear 10 is mounted on the second drive shaft 6 for free rotational movement, but non-movable in axial direction. A corresponding gear 25 is mounted on the single input shaft 22 for free rotational movement, but non-movable in axial direction. It is apparent that the gears 23, 25 are mounted on the input shaft means 22 in the same manner in which the gears 9 and 10 are mounted on the input shaft means 5 and 6. However, gears 9 and 23, and 10 and 25 have different diameters, respectively.

Casing 1 has bearings for supporting a countershaft 14 parallel with drive shaft 3, input shaft means 5, 6, and output shaft 11. Output shaft 11 carries a fixed gear 12 meshing with a gear 18 which is fixed on counter shaft 14. Another gear 17 mounted on counter shaft 14 meshes with the freely rotatable gear 10.

In the construction of FIG. 3, gear 26 is fixedly secured to the counter shaft and meshes with the freely rotatable gear 25.

Two gears 15 and 16 are mounted on the counter shaft 14 for free rotation and respectively mesh with gears 7 and 9. In the construction of FIG. 3, gears 15 and 24 are freely rotatable on the counter shaft and respectively mesh with gears 7 and 23.

A synchronizing shift clutch M1 includes a clutch part 19 mounted on counter shaft 14 for axial movement, but connected with the same for rotation. For operating the transmission of FIG. 1 between the first speed and the third speed, as indicated by the encircled numerals 1 and 3, in FIG. 1, the movable clutch part 19 is shiftable between a position engaging clutch parts S1 secured to gear 15, and a position engaging clutch part S3 secured to gear 16.

A second shift clutch M2 is provided for shifting the transmission between the second and fourth speeds, as indicated by encircled numerals. Shift clutch M2 includes a movable clutch part 13 which is connected with the second input shaft 6 for rotation, and can be axially shifted on a non-circular portion of inner input shaft 6 between a position engaging clutch parts S2 secured to gear 10 and another position engaging clutch parts S4 secured to gear 12.

Corresponding shift clutches M1 and M2 are provided in the construction of FIG. 3, but due to the different diameters of gears 23 to 26 as compared with gears 9, 10, 16, 17, shift clutch M1 shifts the transmission between the first and second speeds, and shift clutch M2 shifts the transmission between the third and the fourth speeds, as indicated by encircled numerals.

The movable clutch part 19 of the construction of FIGS. 1 and 3 has an annular gear rim 20 located in the same plane as gear 8, but spaced from the same. A reversing pinion 21 can be shifted between an inoperative position, not shown, and the illustrated position meshing with gears 8 and 20 and connecting the same for rotation so that drive shaft 5 or 22, respectively, drives counter shaft 14 through reversing gear means 8, 21, 20 so that output shaft 11 is driven in a reverse direction by gears 18, 12 if reversing gear 21 is shifted to its operative position.

Referring now to FIG. 4, the driven clutch parts K1 and K2 are operated by windings 30 and 31 whenever the automatic transmission of FIG. 1 is to be shifted, and in such a manner that the main clutch has an intermediate position in which the drive torque is transmitted through both driven clutch parts K1, K2, which is possible due to slippage of the clutch parts K1, K2 relative to the drive clutch part 4. The electromagnetic operating means 30, 31 are connected to a control box 32 including means for selectively energizing windings 30 and 31.

The synchronizing shift clutch part 13 has a rim embraced by a fork 33 connected by a rod 34 to a cam follower slide enveloping an eccentric cam 36 on a control shaft 37. Depending on the position of the eccentric cam 36, the movable clutch part 13 is moved between its two positions for coupling the input shaft means either with the output gear 12, or with gear, 10.

The movable clutch part 19 and more particularly its annular gear rim 20 is embraced by a fork 45 connected by a link 44 to a cam follower slide 46 embracing the eccentric cam 47 on control shaft 37. Depending on the position of eccentric cam 47, the movable clutch part 19 is placed in a position coupled with gear 15 or another position coupled with gear 16 in the construction of FIG. 1.

Reversing gear 21 is shifted between an inoperative position and an operative position meshing with gears 8 and 20, by means of a link 40 connected to the cam follower slide 42 operated by an eccentric cam 43 on control shaft 37.

Control shaft 37 is connected with a gear 38 meshing with another gear driven by a motor 39 which is controlled by electric control impulses in accordance with the desired gear shift operations.

The control means for the arrangement of FIG. 3 is well known in manually shifted transmissions.

As diagrammatically shown in FIG. 2, the control apparatus shown in FIG. 4 operates the transmission arrangement of FIG. 1 as follows:

In the first stage and speed of the transmission arrangement, driven clutch part K1 and shift clutch part 19 are operated so that clutches K1 and S1 are engaged, while clutch part K2 and clutch part 13 are disengaged. The drive torque is transmitted from drive clutch part 4 to driven clutch part K1 to input shaft 7, over meshing gears 5 and 15 to counter shaft 14, and over meshing gears 18 and 12 to output shaft 11.

At the second speed of the transmission, driven clutch part K2 is engaged, and movable clutch part 13 is operated to couple input shaft 6 with clutch part S2 on gear 10. The drive torque is transmitted through the engaged clutch part K2, input shaft 6, clutch parts 13, S2, and gear 10 to gear 17 on counter shaft 14 from which the torque is transmitted by meshing gears 18, 12 to output shaft 11.

In the third stage of the transmission arrangement of FIG. 1, clutch part K1 is engaged, and clutch part K2 is disengaged. The movable shift clutch part 19 is connected with clutch part S3. A drive torque is transmitted through clutch part K1, input shaft 5, meshing gears 9 and 16, clutch part 19, S3 to counter shaft 14, and through meshing gears 18, 12 to output shaft 11.

The fourth speed requires a direct connection between the input shaft 6 and the output shaft 11. Clutch part K2 is engaged, and clutch part 13 is coupled with clutch part S4 on output gear 12. The drive torque is transmitted from the drive shaft 3 through the engaged clutch part K2, the second input shaft 6, and through clutch part 13, S4 to output gear 12 and output shaft 11.

In addition to the above described four forward speeds of the transmission arrangement, the direction of the output shaft 11 can be reversed by shifting reversing gear 21 to its operative position meshing with gears 8 and 20 for connecting drive shaft 5 with counter shaft 14 which drives through 18 and 12 the output shaft 11. The shift clutches are not engaged so that no forward speed can be transmitted to the output shaft.

In the diagram of FIG. 2, the dots indicate engaged clutches, and the first column indicates the four forward speeds and the reverse.

From the above description it is apparent that the transmission arrangements of FIGS. 1 and 3 have a common basic transmission mechanism including an output shaft, a counter shaft and meshing pairs of gears on the shafts. Some of the gears are freely rotatable on the shafts, and can be coupled with the same by corresponding shift clutches M1 and M2. Shift clutches M1 and M2 with clutch parts 19, S1, S3 and 13, S2, S4 are identical, output gears 18, 12 are identical, gears 7, 15, 8, 21, 20 are identical, and furthermore gears 25 and 26 have the same diameters as gears 9 and 16, respectively, and gears 23 and 24 have the same diameters as gears 10 and 17 respectively.

The transmission arrangement of FIG. 3 is shifted between four stages or speeds, and whenever the transmission is shifted, the torque transmission between the drive shaft 3 and the output shaft 11 is momentarily interrupted.

In the first stage of the transmission arrangement of FIG. 3, the torque is transmitted through main clutch K, gears 7, 15, shift clutch 19, S1, counter shaft 14 and gears 18, 12 to output shaft 11.

In the second speed, the torque is transmitted through main clutch K, gears 23, 24, counter shaft 14, and gears 18, 12 to output shaft 11.

In the third speed, the torque is transmitted through main clutch K, input shaft means 22, shift clutch means 13, S2, gears 25, 26, counter shaft 14, and gears 18, 12 to output shaft 11.

In the fourth speed, the torque is directly transmitted through main clutch K, input shaft means 22, and shift clutch means 13, S4 to output gear 12 and output shaft 11.

From a comparison between the transmission construction of FIGS. 1 and 3, it will become apparent that the expenditures for the automatic transmission arrangement without interruption of the torque are only slightly higher than the expenditure for a manually operated transmission in which the torque is interrupted. It is a great advantage for mass production of parts that the basic transmission mechanism is common in both transmission arrangements so that the automatic transmission of FIG. 1 is only slightly more expensive than a standard manual shift transmission due to the fact that almost all parts of the automatic transmission can be manufactured during the production of the manual transmission, and that only two different input units with input shaft means 5, 6 and 22, respectively, have to be stored. Since input shaft means 5, 6 has the same outline as input shaft means 22, either input shaft means can be mounted on bearing means 1a, and support transmission members 7,8,9,10 or 7,8,23,25 of the basic transmission mechanism.

A transmission arrangement with four forward gear stages or speeds has been described, but it is possible to construct transmission arrangements with common basic transmission mechanisms providing a smaller or greater number of forward speeds.

In accordance with the invention, as many parts as possible are common to a plurality of transmission arrangements, and constitute a basic transmission mechanism which can be manufactured in large series at low cost.

It will be understood that each of the elements described above, or two or more together, may also find a useful application in other types of transmission arrangements differing from the types described above.

While the invention has been illustrated and described as embodied in a basic transmission mechanism common to different transmission arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Transmission arrangement comprising, in combination,
    a basic transmission unit including a housing having two axially aligned bearings, a drive shaft mounted in one of said bearings, an output shaft mounted in the other bearing and having an output gear, two pairs of first and second transmission members, the first and second transmission members of each pair having first and second central openings with first and second different inner diameters, said first inner diameters of said first transmission members being equal and said second diameters of said second transmission members being equal, transmission means connecting said second transmission member of one pair of said first and second transmission members with said output shaft, and including a shift coupling between said output gear and second transmission member of said one pair of first and second transmission members, and being operable between first and second coupling positions for driving said output shaft at different speeds from said second transmission member;
    a first input unit including first input shaft means having an operative position located in said housing, coaxial with said drive shaft, and including a hollow input shaft and an inner input shaft located in said hollow input shaft and having a shaft portion projecting from said hollow input shaft, the diameters of said hollow input shaft and of said inner input shaft being the same as said first and second inner diameters, respectively, said hollow input shaft and said projecting shaft portion supporting in said operative position of said first input unit said first and second transmission members of one pair of said first and second transmission members fixedly and for free rotation, respectively, said projecting shaft portion having a first journal portion, and a non-circular end portion axially spaced from said output shaft and supporting said shift coupling for rotation with said inner input shaft and for axial movement between said first and second coupling positions, and first main clutch means coaxial with said drive shaft for selectively connecting said drive shaft with said hollow input shaft and with said inner input shaft, respectively;
    a second input unit including second stepped solid integral input shaft means having an operative position located in said housing coaxial with said drive shaft, and including a solid thick shaft portion having said first diameter of said hollow input shaft, and a thin shaft portion axially projecting from said thick shaft portion, and having said second diameter of said inner input shaft, said thick and thin shaft portions having in an axial plane therethrough the same outline as said hollow and inner input shafts have in an axial plane therethrough, said thick and thin shaft portions supporting the other pair of said first and second transmission members with matching inner diameters, respectively, fixedly and for rotation, respectively, said thin shaft portion of said second integral input shaft means having a second journal portion having the same diameter as said first journal portion, and a non-circular end portion axially spaced from said output shaft, and supporting said shift clutch for axial movement between said first and second coupling positions coupled with said output gear and with said second transmission member, respectively, of the other pair of first and second transmission members, and second main clutch means coaxial with said drive shaft for connecting said drive shaft with, and for disconnecting said drive shaft from, said thick shaft portion of said second integral input shaft means;
    and mounting means including bearing means supported in said housing for selectively mounting said first and second journal portions of said first and second input units within said housing in said operative positions, respectively, for selectively combining either said first input unit or said second input unit with said basic transmission unit so that the same forms with said first and second input units, respectively, different transmissions.

2. Transmission arrangement as claimed in claim 1 wherein said transmission members are input gears having central openings into which said first and second input shaft means, respectively, fit.

3. Transmission arrangement as claimed in claim 1 wherein said drive shaft, said first and second input shaft means in said operative positions, and said output shaft are aligned along a common axis.

4. Transmission arrangement as claimed in claim 1 wherein said hollow input shaft and said thick input shaft portion fixedly support in said operative positions, respectively, said first transmission members mounted thereon; wherein said shaft portion of said inner shaft and said thin shaft support said second transmission members mounted thereon for free rotation, respectively, in said operative positions, respectively.

5. Transmission arrangement as claimed in claim 1 wherein said basic transmission unit includes a reversing gear having a central opening with said first diameter for being fixedly mounted on said hollow shaft and on said thick shaft portion, respectively, of said first and second input shaft means in said operative positions, respectively, a counter shaft parallel with said input shaft means, another reversing gear mounted on said counter shaft for rotation therewith, gear means connecting said counter shaft with said output shaft, and an axially shiftable third reversing gear movable to and from a position connecting said reversing gears for rotation together.

6. Transmission arrangement as claimed in claim 1 wherein said first main clutch means includes electromagnetic means for moving the same between two engaged positions connected with said hollow and inner input shafts means, respectively.

7. Transmission arrangement as claimed in claim 1 wherein said first main clutch means has an intermediate position in which both said hollow and inner input shafts are coupled with said drive shaft.

* * * * *